United States Patent [19]

Whiteside

[11] 4,035,813
[45] July 12, 1977

[54] EXPOSURE CONTROL SYSTEM FOR SELECTIVELY DETERMINING EXPOSURE INTERVAL

[75] Inventor: George D. Whiteside, Lexington, Mass.

[73] Assignee: Polaroid Corporation, Cambridge, Mass.

[21] Appl. No.: 619,381

[22] Filed: Oct. 3, 1975

[51] Int. Cl.² .................... G03B 7/14; G03B 15/03
[52] U.S. Cl. ................................. 354/27; 354/34; 354/133; 354/139
[58] Field of Search ............... 354/34, 27, 29, 30, 354/32, 129, 133, 139, 149, 60 F

[56] References Cited

U.S. PATENT DOCUMENTS

| | | | |
|---|---|---|---|
| 3,610,122 | 10/1971 | Biber | 354/35 |
| 3,659,509 | 5/1972 | Burgarella | 354/34 |
| 3,667,357 | 6/1972 | Matsuda | 354/60 F |
| 3,687,029 | 8/1972 | Leczkowski | 354/34 |
| 3,709,113 | 1/1973 | Wood | 354/34 |
| 3,821,754 | 6/1974 | Nobusawa | 354/51 |
| 3,886,568 | 5/1975 | Yazaki et al. | 354/27 |

Primary Examiner—L. T. Hix
Assistant Examiner—J. A. LaBarre
Attorney, Agent, or Firm—Edward S. Roman

[57] ABSTRACT

An exposure control system is provided for a photographic apparatus of the type which may be used in conjunction with a source of artificial illumination to illuminate darkened portions of a photographic subject under relatively high levels of ambient scene light intensity. The exposure control system includes means for programming the exposure control in a select manner so as to respond to the artificial light source being utilized under relatively high levels of ambient scene light intensity. The exposure is programmed by determining the exposure interval as a function of whether the artificial light source is ignited in an ordinary manner after a predetermined time delay subsequent to the commencement of the exposure cycle or in a so called "fill-in flash" manner as a function of the integrated ambient scene light intensity reaching a predetermined level. More specifically, operation of the camera in a fill-in flash mode provides for a specific adjustment to the exposure anticipation characteristic which adjustment may restore the anticipation characteristic to that used during normal ambient scene lighted conditions.

20 Claims, 4 Drawing Figures

EXPOSURE CONTROL SYSTEM FOR SELECTIVELY DETERMINING EXPOSURE INTERVAL

BACKGROUND OF THE INVENTION

1. Field of the Invention

This invention relates generally to photographic apparatus having exposure control means responsive to fill-in flash mode of operation and, more particularly, to an exposure control system for photographic apparatus wherein the control system is selectively responsive to the energization of a source of artificial illumination in a "fill-in flash" mode of operation where the ambient scene light intensity levels are relatively high, but portions of the photographic subject are relatively dark.

2. Description of the Prior Art

When taking a photograph under conditions at which the levels of ambient scene light intensity are relatively high, but portions of the photographic subject are relatively dark, it may be desirable to provide additional scene illumination from a source of artificial illumination such as a flashlamp or from an electronic flash device sometimes referred to as a strobe unit. Situations where a source of artificial illumination are used in relatively high ambient light levels are commonly referred to as fill-in flash mode of operation as more fully described in a U.S. Pat. No. 3,610,122 entitled "Shutter Timing System" issued Oct. 5, 1971, by C. H. Biber and assigned in common herewith. Automatic photographic exposure control systems of the type typically configured to combine a light sensitive timing network and a voltage sensitive triggerng circuit, or the like, in controlling relationship with a shutter assembly may also be utilized in photographic situations requiring a fill-in flash form of illumination. Such automatic exposure control systems are capable of providing full control over the regulations of a fill-in flash exposure interval and must also be compatible for operation with artificial illumination under scene conditions representing relatively low ambient light levels.

An artificial illumination control system as is fully described in an application for U.S. Pat. Ser. No. 619,384 by E. Shenk filed concurrently herewith, is provided for a photographic camera for operation in a manner whereby under extremely low levels of ambient scene light intensity, the control system initiates the energization of a source of artificial illumination at a predetermined time period subsequent to the initiation of the exposure interval. Conversely, under conditions of substantially high levels of ambient scene light intensity, the control system initiates the energization of the source of artificial illumination as a consequence of the time integration of the scene light intensity incident to a photoresponsive element reaching a predetermined value. Thus, the artificial illumination control system is automatically operated in both a normal flashmode and a fill-in flash mode depending upon the level of ambient scene liht intensity.

An exposure control system compatible for use with the above-described aritifical illumination control system should be capable of selectively determining exposure interval as a function of whether the camera apparatus is operated in the fill-in flash mode of operation where levels of ambient scene light intensity are relatively high or the ordinary flashmode of operation where levels of scene light instensity are relatively low.

Therefore, it is a primary object of this invention to provide an exposure control system compatible for use in a photographic apparatus of the type having an artificial illumination control system which operates automatically in either a normal flashmode of operation or a fill-in flash mode of operation depending upon the levels of ambient scene light intensity.

It is a further object of this invention to provide an exposure control system for selectively determining exposure interval in response to a camera apparatus being operated in a fill-in flash mode of operation.

It is also an object of this invention to provide an exposure control system for determining a select exposure interval as a function of the energization of a source of artificial illumination as a consequence of the time integration of the scene light intensity incident to a photo-responsive element reaching a predetermined value under conditions of relatively high ambient scene light intensity thus automatically precipitating a fill-in flash mode of operation.

Other objects of the invention will in part be obvious and will in part appear hereinafter. The invention accordingly comprises the mechanism and system possessing the construction, the combination of elements and arrangement of parts which are exemplified in the following detailed disclosure.

SUMMARY OF THE INVENTION

A photographic camera for use in both ambient and artificial scene lighted conditions including a housing together with means within the housing for receiving a source of artificial energy as well as means for connecting to a source of artificial illumination. Means are additionally provided within the housing for defining a film exposure plane. The photographic camera additionally includes a blade assembly together with means for mounting the blade assembly for selective simultaneous displacement from an initial closed arrangement wherein the blade assembly precludes scene light from impinging on the exposure plane to an open arrangement wherein the blade assembly permits scene light to impinge on the exposure plane and the to a final closed arrangement wherein the blade assembly again precludes scene light from impinging on the exposure plane. The displacement of the blade assembly serves to define an exposure interval during which scene light impinges on the exposure plane through changing aperture sizes defined by the blade assembly. There are additionally included means for actuating the mounting means to initiate the displacement of the blade assembly from its initial closed arrangement towards its open arrangement thereby commencing the exposure interval. Scene light detecting means respond to scene light to provide an output signal in correspondence to the deteced scene light subsequent to the commencement of the exposure interval. Energization of the source of artificial illumination is initiated in response to the output signal of the scene light detecting means reaching a first predetermined valve thereby providing artificial illumination to fill-in the ambient scene light. The mounting means are thereafter actuated to initiate the displacement of the blade assembly into its final closed arrangement in response to the output signal of the scene light detecting means reaching a second predetermined value. Means also respond to the initiation of the energization of the source of artificial illumination in response to the output signal of the scene light detecting means reaching the first predetermined value to alter the corresponding relationship between the detected scene light and the second predetermned value thereby facilitating exposure operations whereby artificial illumination is utilized to fill-in existent ambient scene light.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

DESCRIPTION OF THE PREFERRED EMBODIMENT

Figure 1:
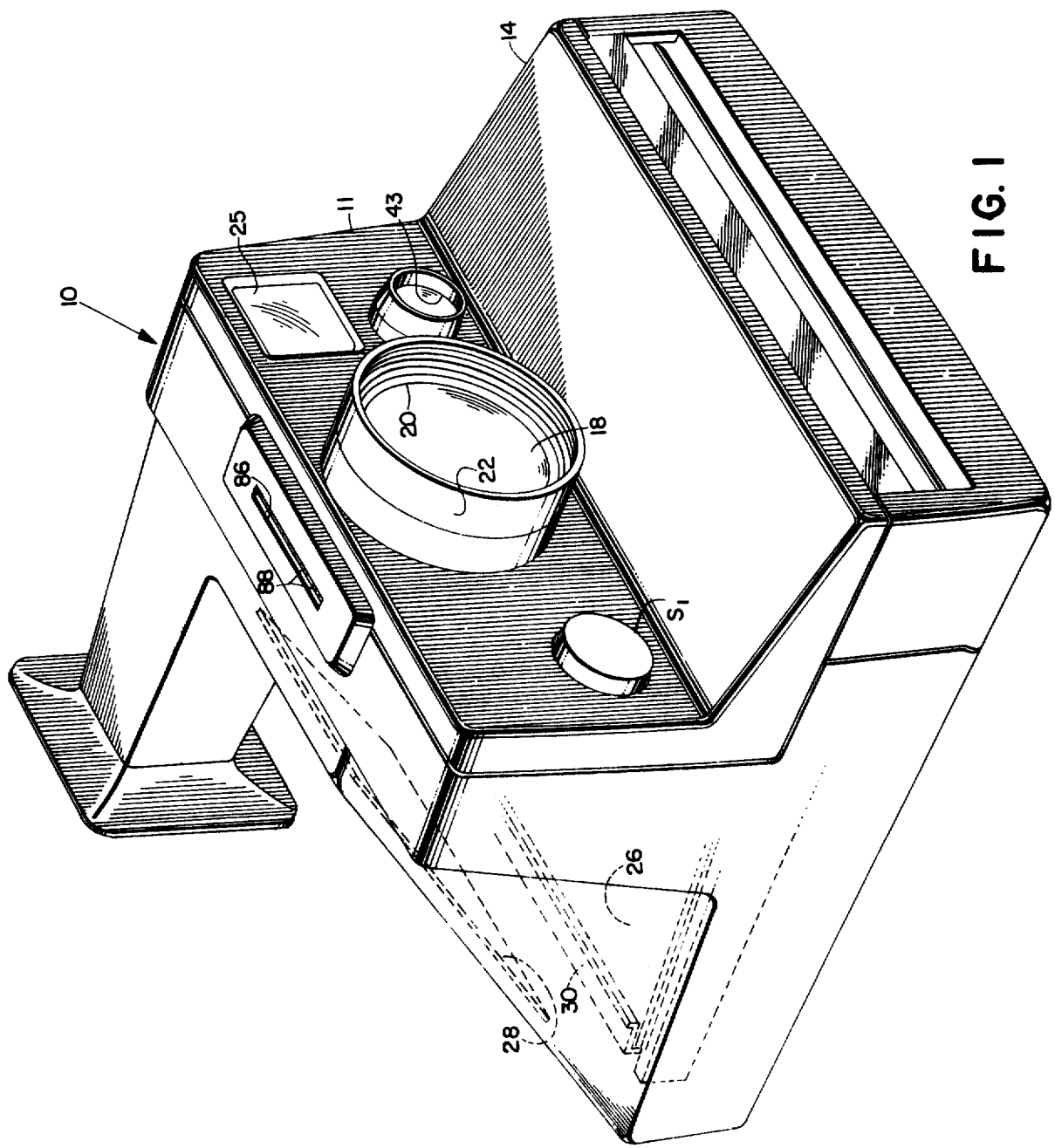
FIG. 1 is a perspective view of a photographic camera apparatus embodying the exposure control system of this invention.

Referring now to FIGS. 1 an 2, it can be seen that the exposure control system of this invention is associated with a photographic camera apparatus 10 contained within the housing 11. A baseblock casting 12 is fixedly stationed within the housing 11 and selectively machined to support the various components of an exposure mechanism shown generally at 13. Surrounding the front and top of the baseblock casting 12, there is provided a cover section 14 which includes at least one opening through which extends a manually adjustable focus bezel 22. Centrally disposed within the baseblock casting 12, there is provided a light entering exposure opening 16 which defines the maximum available exposure aperture for the system.

Figure 2:
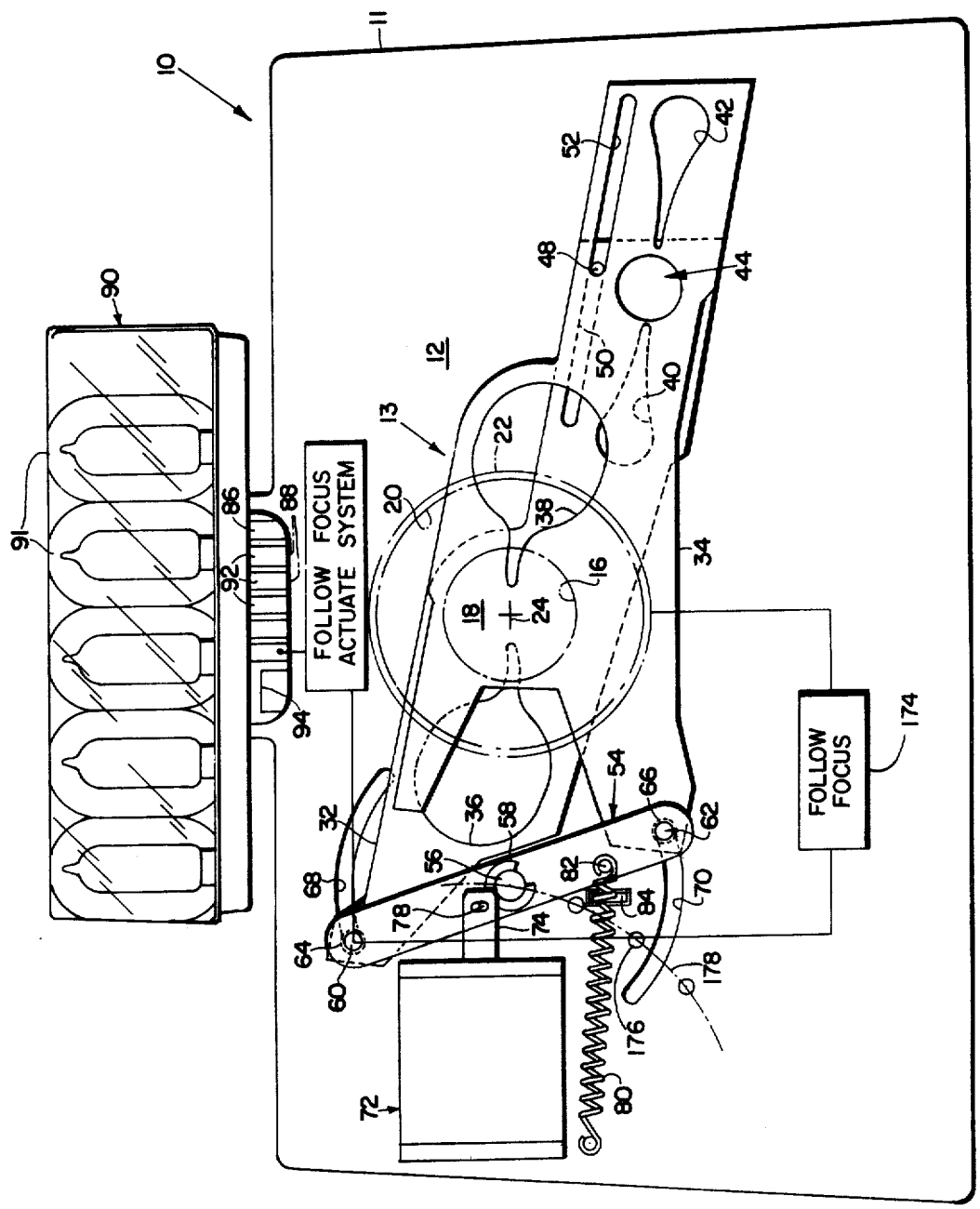
FIG. 2 is a front cross-sectional view of the camera of FIG. 1 showing a portion of the exposure control system.

An objective or taking lens 18 is provided in overlying relation to the light entering opening 16 wherein the objective lens 18 may comprise a plurality of elements retained in predetermined spaced relation by a cylindrical lens mount 20 which is externally threaded for toothed engagement within the internally threaded focus bezel 22. As is readily apparent, focus bezel 22 is made rotatable with respect to the front cover 14 to provide translational movement of the elements of lens 18 along the center axis 24 of the optical path of the housing 11. As is readily apparent, the central optical axis 24 is illustrated in FIG. 2 as being normal to the plane of the drawing. Thus, rotation of the focus bezel 22 may be carried out by manual rotation to provide displacement of the elements of objective lens 18 for focusing the image carrying rays through the light entering exposure opening 16 to a rearwardly positioned film plane 26 by way of a reflecting mirror 28 all of which are stationed within a suitable light tight film exposure chamber 30 within the housing 11.

Intermediate the objective lens 18 and light entering exposure opening 16, there are supported two overlapping shutter blade elements 32 and 34 which will be subsequently described in greater detail herein. Extending from the front cover 14 there is provided a photographic cycle initiating button $S_a$, the depression of which commences the exposure interval by ultimately effecting the release of the shutter blade elements 32 and 34. In addition, there is provided a viewfinder shown generally at 25 which enables a photographer to properly frame the desired scene to be photographed.

A pair of scene light admitting primary apertures 36 and 38 are provided respectively in the blade elements 32 and 34 to collectively define a progressive variation from effective aperture openings in accordance with simultaneous longitudinal and lateral displacement on one blade element with respect to the other blade element in a manner as is fully described in a U.S. Patent application Ser. No. 585,128 entitled "Camera With Pivoting Blades" by George D. Whiteside, filed July 2, 1974, and assigned in common herewith. The apertures 36 and 38 are selectively shaped so as to overlap the light entering exposure opening 16 thereby defining a gradually varying effective aperture size as a function of the position of the blade elements 32 and 34.

Each of the blades, 32 and 34, may additionally be configured to have corresponding photocell sweep secondary apertures shown respectively at 40 and 42. Secondary apertures 40 and 42 may be configured in correspondence with the shapes of scene light admitting primary apertures 32 and 34. As is readily apparent, the secondary apertures 40 and 42 also move in correspondence with the primary apertures 36 and 38 to define a small secondary effective aperture for admitting the passage of scene light transmitted through a second opening 43 in the cover 14 from the scene being photographed. Scene light admitted by the photocell secondary apertures 40 and 42 is thereafter directed to a light detecting station shown generally at 44. The light detecting station includes a photoresponsive element 46 which cooperates with the light integrating and control circuitry of FIG. 3 to terminate an exposure interval as a function of the amount of light received through the secondary effective aperture defined by the overlapping photocell sweep apertures 40 and 42.

Projecting from the baseblock casting 12 at a location spaced laterally apart from the light entering exposure opening 16, is a pivot pin or stud 48 which pivotally and translatively engages elongate slots 50 and 52 formed in respective shutter blade elements 32 and 34. Pin 48 may be integrally formed with the baseblock casting 12 and blade elements 32 and 34 may be retained in engaging relation with respect to the pin 48 by any suitable means such as peening over the outside end of pin 48.

The opposite ends of the blade elements 32 and 34 respectively, include extended portions which pivotally connect to a walking beam 54. Beam 54, in turn, is disposed for rotation relative to the baseblock casting 12 by pivotal connection to a projecting pivot pin or stud 56 which may be integrally formed with the baseblock casting 12 at a location spaced laterally apart from the light entering exposure opening 16. The walking beam 54 may be pivotally retained with respect to the pin 56 by conventional means such as an E ring 58. In the preferred mode, the walking beam 54 is pivotally connected at its distal ends to the shutter blade elements 32 and 34 by respective pin member 60 and 62 which extend laterally outward from the walking beam 54. Pin members 60 and 62 are preferably circular in cross section and extend through respective circular openings 64 and 66 in respective blade elements 32 and 34 so as to slidably engage respective arcuate slots or tracks 68 and 70 which may be integrally formed within the baseblock casting 12. The arcuate tracks 68 and 70 operate to inhibit disengagement of the blade elements 32 and 34 from their respective pin members 60 and 62 during operation of the exposure control system.

A tractive electromagnetic device in the form of a solenoid 72 is employed to displace the shutter blades 32 and 34 with respect to each other and the casting 12. The solenoid 72 may be of conventional design having an internally disposed cylindrical plunger unit 74 which retracts inwardly into the body of the solenoid upon energization of a solenoid coil or winding as shown at 76 in FIG. 3. The solenoid plunger 74 may be affixed to the walking beam 54 by means of a pivot pin or stud 78 such that longitudinal displacement of the plunger 74 will operate to rotate the walking beam around the pivot pin 56 so as to appropriately displace the shutter blades 32 and 34.

The baseblock casting 12 supports the solenoid 72 in a position above a biasing tension spring 80 which operates to continuously urge the blade elements 32 and 34 into positions defining their largest effective aperture over the light entry exposure opening 16. The movable end of spring 80 is attached to walking beam 54 by a pin 82 while the stationary end of spring 80 is grounded with respect to the baseblock casting 12. Thus, with the spring connection herein described, the exposure control system of this invention is biased to continuously urge the shutter blade elements 32 and 34 into an open orientation.

In the present arrangement, the shutter blades 32 and 34 are drawn from their open position to their closed position as shown in FIG. 2 when the solenoid 72 is energized. Consequently, energization of solenoid 72 prevents the shutter blades 32, 34 from moving towards their maximum aperture opening under the urging of spring 80. However, as should be readily understood, the exposure control system of this invention would be equally applicable to photographic systems where the blades 32 and 34 are spring biased in a normally closed position.

Figure 3:
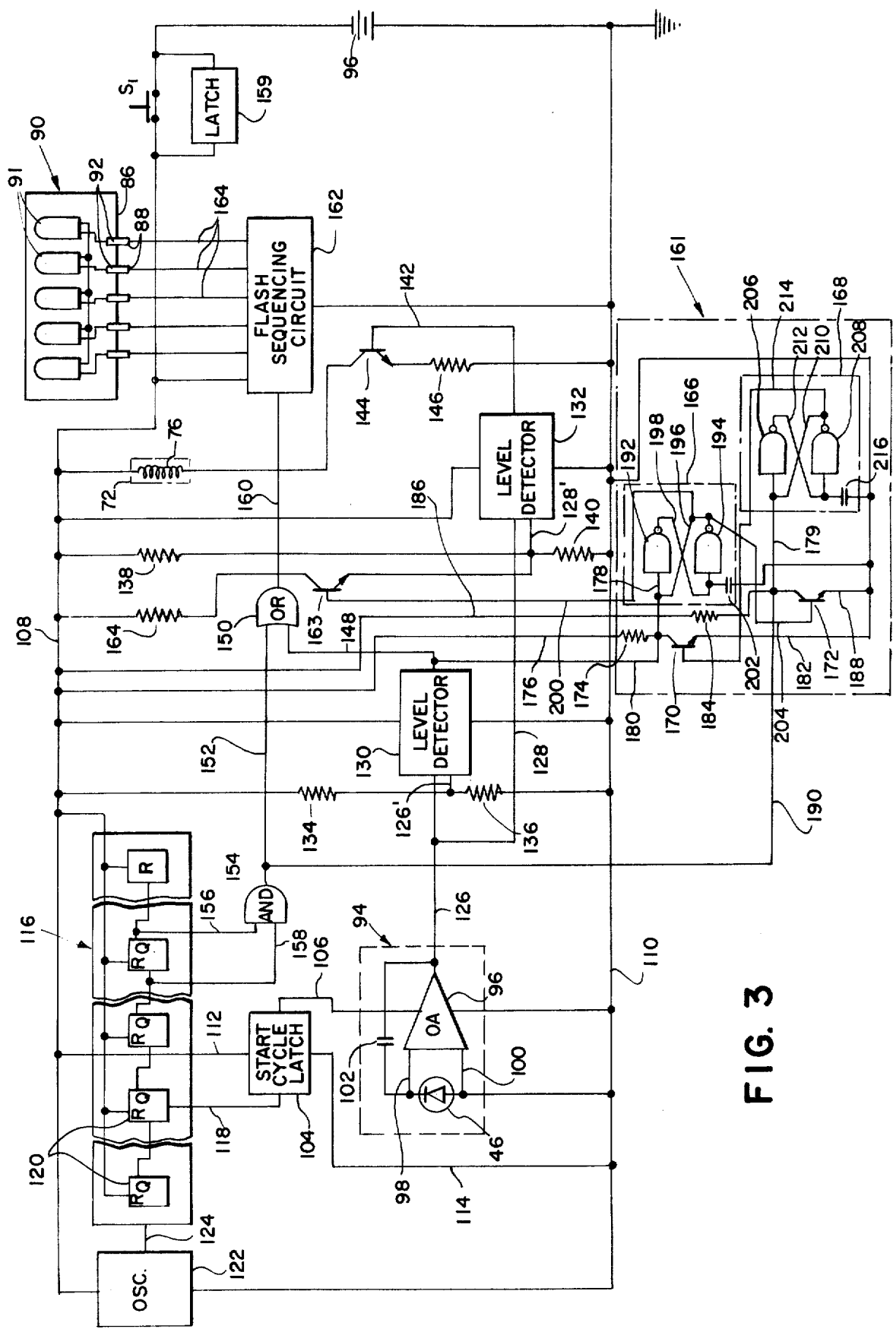
FIG. 3 is a schematic diagram showing the exposure control system of this invention.

Continued energization of the solenoid 72 in order to maintain the shutter blade elements 32 and 34 in their closed positions may result in an undesirable drain in the camera apparatus power source which preferably is an electrical storage battery schematically shown in FIG. 3 at 96. Thus, a mechanical latch as shown generally at 84 may be provided to move into lateral engagement with an edge of the walking beam 54 so as to maintain the blade elements 32 and 34 in their closed position regardless of the energization of solenoid 72. Additional information regarding the structure and operation of the latch 84 is described in an application for U.S. pat. Ser. No. 554,777 entitled "Photographic Apparatus With Sequencing System" by B. K. Johnson, D. Van Allen, and G. D. Whiteside, filed Mar. 3, 1975, in common assignment herewith.

The photographic camera apparatus 10 is utilized in conjunction with a source of artificial illumination which preferably comprises a linear array of flash lamps as shown generally at 90. The linear flash array includes a plurality of individually spaced apart flash lamps 91 which respectively connect to a plurality of spaced apart terminal pads or elements 92. The linear flash array 90 may be releasably connected with respect to the camera housing 11 by way of a receiving socket 86 which also includes a plurality of spaced apart terminal pads or elements 88. The linear flash array 90 may be inserted and withdrawn from the receiving socket 86 in a manner as is fully described in U.S. Pat. No. 3,757,643 entitled "Photoflash Apparatus" by John Burgarella issued Septemeber 11, 1973, and assigned in common herewith.

Under conditions of artificial illumination wherein the light has a relatively short duration, such as from the individual flash lamps 91 of the linear array 90, the anticipated light level at the camera will depend upon the known characteristics of the flash lamps 91 and upon the distance from the subject being photographed to the light source. When the flash array 90 is mounted on the receiving socket 86, there may be actuated a follow focus system whereby the maximum effective aperture to which the shutter blade elements 32, 34 are allowed to progress is determined in accordance with the distance from the taking lens 18 to the subject being photographed. Thus, as the focus bezel 22 is rotated to provide the correct focus for a particular distance from the photographic apparatus 10 to the subject, a follow focus mechanism (shown generally at 174) moves to appropriately displace a follow focus interceptor pin 176 about its locus of travel as shown by a phantom line 178. The follow focus interceptor pin 176 may be selectively actuated to intercept the edge of walking beam 54 in a well known manner as is more fully described in a U.S. patent application Ser. No. 554,777 entitled "Exposure Control System With Improved Follow Focus Capability For Photographic Apparatus", by George D. Whiteside, filed Feb. 28, 1975, and assigned in common herewith. Thus, as is readily apparent, the walking beam 54 may be intercepted by the follow focus interceptor pin 176 at various locations defining various maximum effective apertures which correspond to the distance from which the subject is spaced from the camera apparatus 10.

Turning now to FIG. 3, there is shown a schematic diagram for the exposure control circuitry of this invention including a scene light detecting and integrating circuit shown generally at 94. Circuit 94 includes the photoresponsive element 46 which may be a photovoltaic cell of the type generating an output signal in correspondence with the levels of scene light intensity incident thereon. The photoresponsive element 46 is orientated to evaluate the light levels of a scene coincident with the field of view of the lens system of the camera and operates in conjunction with the above described aperture scanning arrangement which alters the amount of scene light reaching the photoresponsive element 46 in synchronism and corresponding variation with the progressively changing aperture size. The photoresponsive element 46 is coupled with an amplifier stage 96 along input lines 98 and 100 wherein the amplifier 96 is of a type sometimes referred to in the art as an "operational amplifier" which may be of a differential variety preferably fabricated in practical miniaturized form. When considered ideally, the amplifier 96 has infinite gain and infinite input impedance and a zero output impedance.

By virtue of a feedback path comprising an integration capacitor 102 connected between the input line 98 and an output line 126 from the operational amplifier 96, the photoresponsive element 46 is permitted to operate into an apparent low-input impedance so as to function in a current mode, the current generated by the photoresponsive element 46 being limited substantially only by its own internal impedance. Thus, under such loading, the photoresponsive element 46 in conjunction with the operational amplifier 96 and capacitor 192 is capable of providing a desirable linear output corresponding to the time integration of scene light intensity to the photoresponsive element 46.

Any difference of potential supplied by the photoresponsive element 46 across input leads 98 and 100 causes a voltage to be produced at output line 126. The relatively low signal voltages at the input of amplifier 96 which are present with the relatively low signal current from the photoresponsive element 46 are acted upon by the correspondingly high gain characteristic of the amplifier. Thus, although the amplifier 96 has a very high input impedance, the photoresponsive element 46, when connected in the circuit described, experiences only a very low impedance. Therefore, the current output of the photoresponsive element 46 is directed into the feedback path.

The initial charging of the integration capacitor 102 is synchronized with shutter blade actuation by means of a start cycle latch circuit shown generally at 104 which provides an output actuation signal to the operational amplifier 96 by way of interconnecting line 106. The start cycle latch circuit 104 is connected to the supply line 108 and ground line 110 by way of lines 112 and 114, respectively, and is made responsive to the output signal from a ripple counter 116 by way of an interconnecting line 118. The ripple counter 116, in turn, comprises a plurality of serially connected binary circuits 120, each of which can provide an output control signal in a predetermined time sequence as is well known in the art. Binary circuits 120 may be ordinary "flip-flops" interconnected in serial relation with respect to each other whereby the binary count rate is determined by an oscillator circuit 122 connected thereto by way of a line 124.

The output signal from the light detecting and integrating circuit 94 at line 126 is directed to a pair of level detector circuits 130 and 132 by way of interconnecting lines 126 and 128 respectively wherein level detector 130 may control the fill flash function to be subsequently described. Each level detector 130 and 132 may be of any conventional design such as a Schmitt Trigger. As is readily apparent, the steady state reference voltage to the level detector 130 is established by biasing means comprising a first resistor 134 connected between the supply line 108 and the input line 126' together with a second resistor 136 connected between the input line 126' and ground line 110. In like manner, the steady-state reference voltage level to the detector 132 is established by biasing means comprising a third resistor 138 connected between the supply line 108 and the input line 128' together with a fourth resistor 140 connected between the input line 128' and the ground line 110.

The output signal from detector 132 is directed to the base of an NPN transistor 144 by way of an interconnecting line 142. The collector of transistor 144, in turn, is connected to the supply line 108 by way of the solenoid winding 76, while the emitter of transistor 144 is connected to the ground line 110. The output signal from the level detector circuit 130 is directed to an OR gate 150 by way of line 148. The output from the OR gate 150 in turn is directed by way of an interconnecting line 160 to a flash sequencing circuit 162 which may be of a conventional type as is more fully described in U.S. Pat. No. 3,618,492 entitled "Flash Photographic System", by S. Ellin, issued Nov. 9, 1971, and assigned in common herewith. The flash sequencing circuit 162 operatively connects to the linear flash array 90 upon the insertion thereof into the flash array receiving socket 86. The operative connection is made possible by the plurality of spaced apart terminal pads or elements 88 in the receiving socket 86, which elements are electrically are electrically connected to the flash sequencing circuit 162 by way of lines 164 respectively. Thus, insertion of the linear flash array 90 within the receiving socket 86 operates to bring the terminal elements 92 into respective electrical connection with the terminal elements 88. The flash sequencing circuit 162 thereafter operates to sequentially ignite the individual flashlamps 91 by automatically passing a monitoring current through each of the flashlamps during each exposure cycle to derive alignment signals as is fully explained in U.S. Pat. No. 3,618,492, supra.

A second input signal to the OR gate 150 is derived from an AND gate 154 by way of an interconnecting line 152. The AND gate 154, in turn, receives an output signal from the ripple counter 116 by way of lines 156 and 158. As is now readily apparent, the output signal from the AND gate 154 is timed to occur at a predetermined interval subsequent to the actuation of the start cycle latch 104, which coincides to the initiation of the actual exposure interval period.

A latch sequencing circuit shown generally at 161 is provided to selectively vary the steady state reference voltage level to the detector 132 in accordance with whether the exposure control system operates in a fill-in flash mode or an ordinary flash mode. The output signal from the latch sequencing circuit 161 connects by way of a line 200 to the base of an NPN transsistor 163, the collector of which is connected to the line 108 by way of a resistor 164 and the emitter of which is connected to the input line 128'.

The latch sequencing circuit 161 may include two latching circuit, shown generally at 166 and 168, which respectively connect to the collectors of NPN transistors 170 and 172 by way of respective lines 178 and 179. Latch circuit 166 comprises a pair of inverter gates 192 and 194 wherein the output terminal of inverter gate 192 is tied to the input terminal of the inverter gate 194 by way of an interconnecting line 198 with the output terminal of inverter gate 194 in turn being tied to the input terminal of inverter gate 192 by way of a line 196. The input terminal to inverter gate 194 also connects to ground by way of a capacitor 202.

In like manner, the latch circuit 168 comprises a pair of inverter gates 206 and 208 wherein the output terminal of inverter gate 206 is tied to the input terminal of inverter gate 208 by way of an interconnecting line 212, and wherein the output terminal of inverter gate 208 is tied to the input terminal inverter gate 206 by way of an interconnecting line 210. The input terminal to inverter gate 208 connects to ground line 110 by way of a capacitor 216. The emitter of transistor 170 is grounded by way of a line 182 while the collector connects to the supply line 108 by way of a resistor 174 and interconnecting line 176. In addition, the collector of transistor 170 also connects to the output terminal by the level detector 130 by way of an interconnecting line 180. In like manner, the emitter of transistor 172 is connected to the ground line 110 by way of an interconnecting line 188 while the collector is tied to the supply line 108 by way of an interconnecting resistor 184 and line 186. The base terminal for transistor 172 is connected to receive the output signal from latch circuit 166 by way of an interconnecting line 204. In addition, the output signal from latch circuit 168 is tied to the base terminal of transistor 170 by way of a line 214. The output signal from the AND gate 154 is also directed to the collector terminal of transistor 172 by way of an interconnecting line 190.

Subsequent to the insertion of the linear flash array 90 within the flash array receiving socket 86, a low ambient light intensity photographic exposure interval may be commenced upon the depression of the photographic cycle initiation button $S_1$. As will become readily apparent, the operational sequence for the various embodiments of the exposure control system of this invention are described in relation to a photographic camera of the non-single lens reflex type, although the intended scope of the invention is by no means so limited and cameras of the well-known reflex type as described in U.S. Pat. No. 3,672,281 entitled "Reflex Camera", by E.H. Land, may be equally suitable for embodying the exposure control system of this invention. Thus, closure of switch $S_1$ operates to simultaneously move the latch 84 out of engagement with the edge of the walking beam 54 in a manner more fully described in U.S patent application Ser. No. 554,777, supra, as well as to energize the exposure control circuitry of FIG. 3. Disengagement of the latch 84 from the edge of the walking beam 54 permits tension spring 80 to rotate the walking beam 54 in a clockwise direction as seen in FIG. 2. In this manner, the shutter blade elements 32 and 34 are moved in directions which operate to progressively enlarge the effective aperture over the light entering exposure opening 16. Rotation of the walking beam 54 effects simultaneous linear and angular displacement of the shutter blade elements 32 and 34 about pivot pin 48 so that photocell sweep secondary apertures 40 and 42 simultaneously define a corresponding progressively enlarging aperture opening over the photoresponsive element 46.

As is readily apparent, the battery supply voltage across lines 108 and 110 will be maintained only as long as the operator maintains switch $S_1$ in its depressed state, which may be perfectly adequate for situations where the human reaction time in depressing and releasing the switch $S_1$ substantially exceeds the longest exposure cycle time likely to be incurred. However, in situations where the normal exposure cycle time is likely to exceed the human reaction time in depressing and releasing switch $S_1$, there may be provided a latch circuit, as shown generally at 159, in parallel connection with respect to the switch $S_1$ for maintaining continuous energization of the exposure control circuit even after the release of the switch $S_1$. A suitable automatic latch circuit is more fully described in U.S. Pat. No. 3,744,385 entitled "Control System For Photographic Apparatus", by Burgarella et. al., issued July 10, 1973 and assigned in common herewith.

The photoresponsive element 46 provides an appropriate voltage response corresponding to the scene light intensity incident thereon, which voltage response is thereafter integrated by the operational amplifier 96 and feedback capacitor 102 to provide an output signal representative of the time integration of the scene light intensity incident to the photoresponsive element 46. Under conditions of extremely low ambient scene light intensity, the overlapping shutter blade elements 32 and 34 move to their maximum effective aperture defining position at which point a respective flashlamp 91 is energized to artificially illuminate the scene to be photographed in a manner to be subsequently described. Under conditions of low ambient scene light intensity where the voltage response to the photoresponsive element 46 is minimal prior to the energization of the flashlamp 91, the ripple counter 116 will provide the requisite output signal at lines 156 and 158 to switch the AND gate 154 and provide an output signal at line 152 to the OR gate 150. The OR gate 150, in turn, will switch to provide a flash igniting signal to the flash sequencing circuit 162 by way of the interconnecting line 160. As should now be readily apparent, the requisite output signals at lines 156 and 158 for firing a flashlamp occur at a predetermined time period subsequent to the initiation of an exposure internal. The predetermined time period is selected to be at least as long as the longest time required for the shutter blade elements 32 and 34 to reach their maximum aperture defining position. In this manner, the shutter blade elements 32 and 34 will always be at rest at their maximum aperture defining position upon energization of the flash array 90.

During normal flash operation with low ambient scene light intensity, the steady state reference voltage level to the detector 132 is determined exclusively by the biasing resistors 138 and 140 necessitating that transistor 163 be maintained in its off state both prior to and subsequent to the appearance of the flash igniting output signal from the level detector 130. Thus, upon initiation of an exposure interval, the output signals from the AND gate 154 and the level detector 130 will be considered to be low values approaching ground voltage hereinafter referred to as a logic zero signal level. The initial logic zero signal level at line 180 is thereafter inverted by the gate 192 to a high voltage level hereinafter referred to as a logic one signal level. The logic one signal level at line 198 is again inverted by the gate 194 to provide a logic zero signal level at line 200 which is applied to the base of transistor 163 thereby turning off transistor 163. In addition, the logic zero output signal from gate 194 is also applied to the base of transistor 172 by way of line 204 so as to turn off transistor 172.

As the initiation of the exposure interval, the output signal from the AND gate 154 at line 190 also assumes a logic zero signal level which is inverted by the gate 206 to provide a logic one signal level at line 212. The logic one signal level at line 212 is again inverted by the gate 208 to provide a logic zero output signal level at the base of transistor 170 so as to turn off the transistor 170.

The subsequent appearance of the flash igniting signal from the AND gate 154 at lines 152 and 190 is equivalent to a change from a logic zero signal level to a logic one signal level. The change in logic levels is thereafter inverted by gate 206 to provide a logic zero signal level at line 212 which signal level is again inverted by gate 208 to provide a logic one output signal level at line 214 thereby forward biasing the baseemitter junction of transistor 170. In this manner, transistor 170 is turned on to effectively tie line 180 to ground line 110 for the remainder of the exposure interval regardless of whether the input voltage level to the detector 130 thereafter reaches its predetermined trigger level. Since the input voltage level to the latch circuit 166 remains effectively tied to ground for the remainder of the exposure interval, the logic zero output signal level at line 200 will also continue to maintain the transistor 163 in its cutoff state for the remainder of the exposure interval.

Subsequent to the energization of the flashlamp 91, there will occur a rapid rise in the time integration of the scene light intensity incident to the photoresponsive element 46. Thus the output signal level at lines 126 and 128 from the scene detecting and integrating circuit 94, which corresponds to the integrated scene light intensity, continues to increase until reaching a predetermined value corresponding to a select film exposure. At this point, the level detector 132 is triggered into an abrupt change of state at the output line 142, from a generally low value which is insufficient to maintain the transistor 144 in conduction, to a substantially higher voltage level of sufficient value to turn on transistor 144 and thus establish a current flow from collector to emitter through transistor 144. Turning on transistor 144, in turn, operates to energize the solenoid winding 76 to retract the plunger unit 74 so as to rotate the walking beam 54 in a counterclockwise direction, as viewed from FIG. 2, against the biasing force of tension spring 80, thereby moving the shutter blade elements to their light blocking closed postion. After the walking beam 54 is rotated to its full counterclockwise position, the latch 84 may be automatically moved into intercepting relation with the edge of the walking beam so as to permit the deenergization of the solenoid in a manner as is more fully described in U.S. Pat. application Ser. No. 554,555, supra. As is now readily apparent, the level detector 130 would otherwise have been triggered prior to the level detector 132 to provide a high voltage output signal level at line 148 were not line 148 tied to ground line 110 by way of lines 180 and 182 as well as the forward biased collector-emitter junction of transistor 170.

In situations where the ambient scene light intensity levels are relatively high and portions of the photographic subject relatively dark, the photographic exposure control system ideally is capable of operating in the so-called fill-in flash mode of operation to provide supplementary illumination. Under these conditions of increased levels of ambient scene light intensity, the film will receive its correct exposure prior to the predetermined time period at which the flash igniting output signal from the AND gate 154 appears. For this reason, level detector 130 is included to provide an alternate means for igniting a flashlamp as a function of the integrated scene light intensity prior to the predetermined time period at which a flashlamp would otherwise be ignited by the output signal from the AND gate 154, as is more fully described in a copending application for U.S. patent Ser. No. (Our case No. 5370) by E. Shenk filed concurrently herewith. During the fill-in flash mode of operation where artificial illumination is utilized in an environment of high ambient scene light intensity, it may be desirable to "fine tune" the exposure program by actuating the solenoid 72 to terminate the exposure interval at a different select exposure value corresponding to a different level of integrated scene light intensity. Toward this end, transistor 163 and resistor 164 are provided in parallel connection with respect to the biasing resistor 140 for selective operation only during the fill-in flash mode of operation where a flashlamp 91 is ignited as a function of the triggering of level detector 130 prior to the predetermined time delay at which the output signal from AND gate 154 occurs.

The fill-in flash mode of operation is commenced in the previously described manner upon the depression of the photographic cycle initiating button $S_1$ which operates to simultaneously move the latch 84 out of engagement with the walking beam 54 as well as to energize the control circuit of FIG. 3. As previously discussed, disengagement of the latch 84 from the edge of the walking beam 54 permits the tension spring 80 to rotate the walking beam in a clockwise direction as viewed in FIG. 2 so as to initiate the exposure interval and permit the shutter blade elements 32 and 34 to approach their maximum aperture defining position. As a result of the increased ambient scene light intensity, the time integration of the scene light intensity incident to the photoresponsive element 46 proceeds substantially more rapidly than that of the previously discussed low ambient scene light intensity situation. The steady state reference voltage signal level to detector circuit 130 is biased by the resistors 134 and 136 at the initiation of the exposure interval to coincide with the predetermined value required to trigger level detector 130. As is readily apparent, the predetermined trigger value for detector 130 is selected to be below the predetermined trigger value for level detector 132, and preferably, is only approximately 30 percent of the predetermined trigger value required to switch detector 132. The output voltage signal from the light detecting and integrating circuit 94 at line 126 thereafter increases to trigger the level detector 130, thereby changing the output signal level therefrom from a generally low logic zero level to a generally high logic one level of sufficient value to switch the OR gate 150. The output signal at line 160 from the OR gate, in turn, is directed to energize an appropriate flashlamp 91 by way of the flash sequencing circuit 162.

The change from a logic zero output signal level to a logic one output signal level at line 180 is inverted by the gate 192 to provide a logic zero signal level at line 198 which is again inverted by gate 194 to provide a logic one output signal level at line 200 so as to forward bias the base-emitter junction of transistor 163 thereby turning on transistor 163 to establish a collector to emitter current flow. The high logic one output signal level from gate 194 is also transmitted to the base of transistor 172 by way of line 204 so as to simultaneously turn on transistor 172 thereby effectively tying line 190 to ground line 110. Thus, if the input signal levels at lines 156 and 158 should reach the requisite levels to switch the AND gate 154 subsequent to the triggering of the level detector 130, but prior to the triggering of the level detector 132, the output signal at line 152 from the gate 154 will nevertheless remain tied substantially to the ground line 110 by way of the lines 190 and 188 together with the forward biased collector-emitter junction of transistor 172.

In this manner, the exposure may be selectively altered as a result of the exposure control system being operated in a fill-in flash mode of operation. As is now readily apparent, turning on transistor 163 operates to effectively connect the resistor 164 in parallel relation with respect to resistor 138 thereby increasing the steady state reference voltage level to the detector 132 so as to require a greater change in the output signal from the light detecting and integrating circuit 94 in order to trigger detector 132. Alternatively, transistor 163 and resistor 164 could be connected between the input line 128' and ground line 110 so that turning on transistor 163 operates to effectively connect the resistor 164 in parallel relation with respect to resistor 140 thereby decreasing the steady state reference voltage level to detector 132 so as to decrease the change required in the output signal level from the light detecting and integrating circuit 94 in order to trigger the level detector 132.

Although the output signal from level detector 130 has been described as controlling the ignition of a flashlamp for fill-in flash purposes, it will be readily understood that other exposure program determining parameters in addition to the fill-in flash ignition may also be controlled from the level detector 130. One such other exposure program determining parameter may be a shutter blade braking signal as more fully described in an application for U.S. Pat. Ser. No. 619,385 by E. Shenk and J. Muggli filed concurrently herewith.

Figure 4:
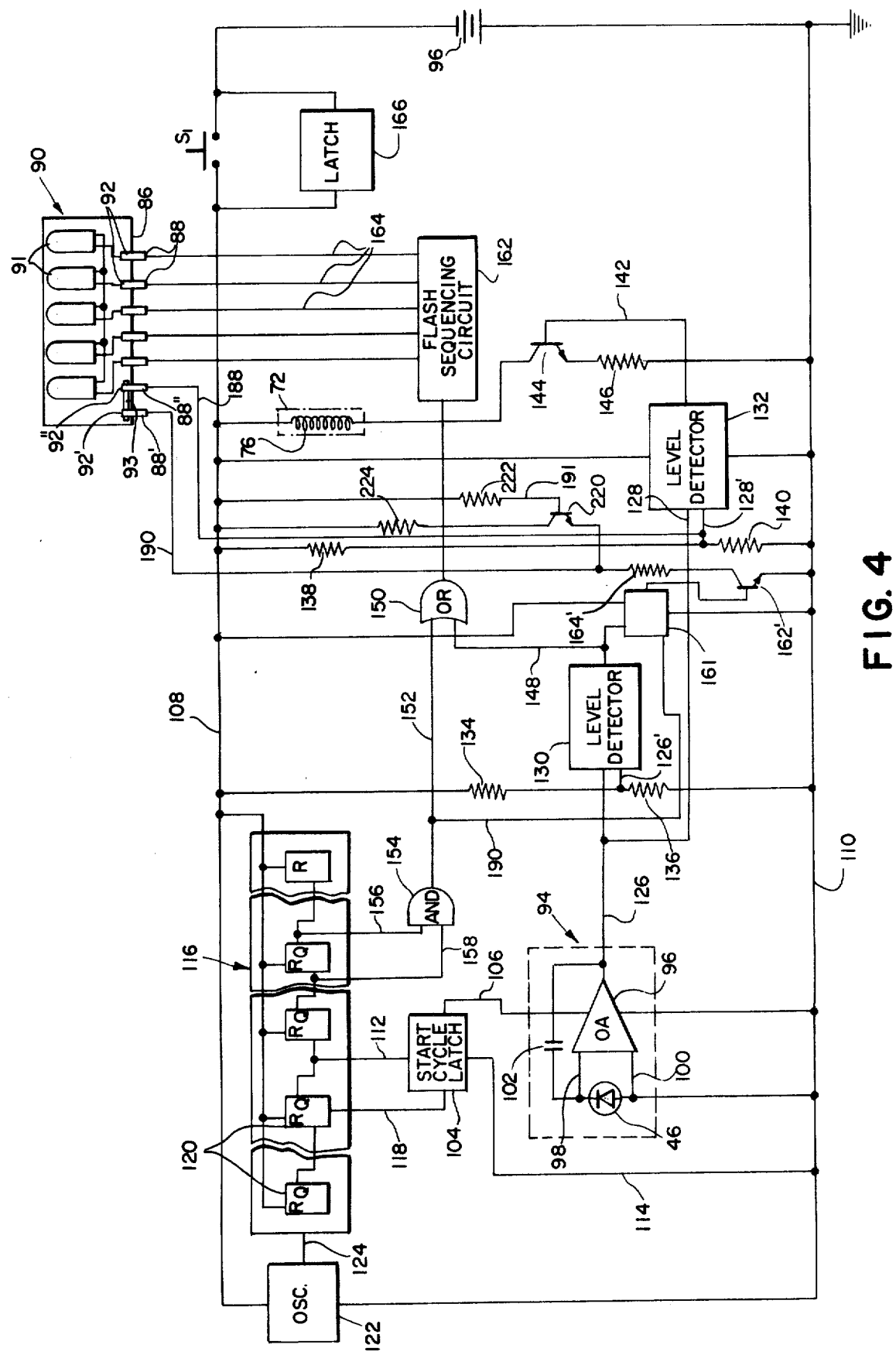
FIG. 4 is a schematic diagram showing an alternate embodiment for the exposure control system of this invention.

Referring now to FIG. 4 where like numerals designate previously described elements, there is shown an exposure control circuit where insertion of the linear flash array 90 into the socket 86 additionally operates to bring terminal elements 92',92" into respective electrical contact with terminal elements 88',88" from the control circuit. The two spaced apart terminal elements 92' and 92" of the linear flash array are electrically coupled by means of an interconnecting electrically conductive shorting element or bar 93 of a type more fully discussed in U.S. Pat. No. 3,757,643.

The steady state reference voltage to the level detector 132 determined by resistors 138 and 140 may be selectively altered by switching means comprising an NPN transistor 220 of which the collector is connected to the supply line 108 by way of a resistor 224. The base of transistor 220 in turn is also connected to the supply line 108 by way of a resistor 222 and interconnecting line 191. The collector terminal of transistor 162' is connected to the emitter terminal of transistor 220 by way of a resistor 164'. In addition, terminal element 88" is connected to the input line 128 by an interconnecting line 188 while the terminal element 88' is connected to the emitter of transistor 220 by way of the line 190.

Thus, insertion of the linear flash array 90 into the flash array receiving socket 86 operates to connect the emitter of transistor 220 to the input line 128' by way of lines 190, 188 and shorting bar 93. Thus, transistor 220 is turned on so as to effectively connect resistor 224 in parallel relation with respect to resistor 138 so as to further increase the steady state reference voltage level at line 128' above the initial predetermined voltage level required to trigger the level detector 132. Thus, as is now readily apparent, during the ordinary flash mode of operation the change in the output signal at line 128 resulting from the light integration of circuit 94 subsequent to the commencement of an exposure interval must be greater than that required during the ambient mode in order to reach the predetermined value required to trigger the level detector 132 into energizing the solenoid winding 76 as is more fully described in a copending application for U.S. patent Ser. No. (Our Case No. 5368) by George D. Whiteside filed concurrently herewith.

Should the camera apparatus be utilized in the abovedescribed fill-in-flash mode of operation, it may be desirable to restore the change in the output signal from the light detecting and integrating circuit 94 required to trigger the level detector 132 to its original value prior to insertion of the linear flash array 90 within the socket 86. The reason for this is that the fill-in-flash mode of operation occurs during high levels of ambient scene light intensity and therefore more closely approximates an ordinary exposure taken with the available scene light, albeit a source of artificial illumination is utilized to fill in potential shadows.

Towards this end, transistor 162' and resistor 164' may be selectively actuated by level detector 130 to effectively couple the resistor 164' in parallel relation with respect to resistor 140 thereby restoring the steady state reference voltage level to the detector 132 to its original value prior to the insertion of the linear flash array 90. Thus, during the fill-in-flash mode of operation where a high logic one output signal level occurs from the level detector 130 prior to a high logic one output signal level at line 152 from the AND gate 154, the transistor 162' is turned on by way of the sequencing circuit 161 in the aforementioned manner so as to restore the steady state reference voltage level at line 128' to its original value prior to the turning on of transistor 220. Conversely, should the ambient scene light intensity be inadequate to trigger the level detector 130 prior to the predetermined time interval at which a logic one output signal level from the AND gate 154 occurs, then transistor 162' will be latched off by circuit 160 in the aforementioned manner for the remainder of the exposure interval regardless of the subsequent triggering of level detector 130. Thus, the steady state reference voltage level at line 128' to detector 132 remains constant for both the ordinary ambient light mode of operation without artificial illumination and the fill-in-flash mode of operation utilizing artificial illumination in conjunction with high levels of scene light intensity. During the ordinary flash mode of operation, however, where levels of scene light intensity are low, the steady state reference voltage level on line 128' to detector 132 may be altered to adjust the exposure program.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. A photographic camera comprising:
   a housing;
   an objective lens mounted on said housing;
   means within said housing for receiving a source of electrical energy;
   means within said housing for defining a film exposure plane;
   a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane;
   scene light detecting means energizable by the source of electrical energy for providing an output signal in correspondence to the amount of scene light detected subsequent to the commencement of an exposure interval; and means, at least in part energizable by the source of electrical energy, for initiating the displacement of said blade assembly from its said initial closed arrangement towards its said second arrangement thereby commencing a particular exposure program defined by a plurality of exposure parameters and then, responsive to said output signal of said scene light detecting means reaching a first predetermined value, for effecting the displacement of said blade assembly into its said final closed arrangement, and, responsive to said output signal of said scene light detecting means reaching a second predetermined value less than said first predetermined value prior to said blade assembly reaching its said second arrangement, for 1. changing the value of said output signal required to effect the displacement of said blade assembly into its said final closed arrangement from said first predetermined value to another predetermined value under such situations, and 2. additionally effecting a modification of a characteristic of another exposure parameter associated with said particular exposure program from the character said given exposure parameter assumes in situations wherein said blade assembly arrives at its said second arrangement before said output signal of said scene light detecting means reaches its said second predetermined value.

2. A photographic camera comprising:

a housing;

an objective lens mounted on said housing;

means within said housing for receiving a source of electrical energy;

means operatively associated with said housing for receiving a source of artificial illumination, said receiving means including electrical terminals for electrically communicating with the source of artificial illumination;

means within said housing for defining a film exposure plane;

a blade assembly mounted and arranged within said housing for displacement from an initial closed arrangement wherein said blade assembly precludes scene light from impinging on said exposure plane to a second arrangement wherein said blade assembly defines a maximum aperture through which scene light is permitted to impinge on said exposure plane and then to a final closed arrangement wherein said blade assembly again precludes scene light from impinging on said exposure plane, such a displacement of said blade assembly serving to define an exposure interval during which scene light is incident upon said film exposure plane;

scene light detecting means energizable by the source of electrical energy for providing an output signal in correspondence to the amount of scene light detected subsequent to the commencement of an exposure interval; and means, at least in part energizable by the source of electrical energy, for initiating the displacement of said blade assembly from its said initial closed arrangement towards its said second arrangement thereby commencing a particular exposure program defined by a plurality of exposure parameters, for initiating the electrical energization of said terminals after the expiration of a predetermined time delay following the initiation of the displacement of said blade assembly towards its said second arrangement to effect the firing of the source of artificial illumination and then, responsive to said output signal of said scene light detecting means reaching a first predetermined value, for effecting the displacement of said blade assembly into its said final closed arrangement, and further, responsive to said output signal of said scene light detecting means reaching a second predetermined value less than said first predetermined value prior to the expiration of said predetermined time delay, for 1. immediately initiating the electrical energization of said terminals whereby said source of illumination is fired prior to the lapse of said predetermined time delay under such conditions, and 2. additionally changing the value of said output signal required to effect the displacement of said blade assembly into its said final closed arrangement from said first predetermined value to another predetermined value under such conditions.

3. The camera of claim 2 wherein:

said scene light detecting means include means for detecting and integrating scene light incident to the camera subsequent to the commencement of the exposure interval in order that the output signal from said scene light detecting means also correspond to the integrated scene light; and the means for initiating the firing of the source of artificial illumination in response to the output signal of said scene light detecting means reaching said second predetermined value include a first signal level detector having means by which the output signal from said scene light detecting means may be applied thereto and an output signal derived therefrom wherein said output signal from said level detector abruptly changes to initiate said firing of the source of artificial illumination in response to the output signal of said scene light detecting means reaching said second predetermined value, and additionally including first biasing means for establishing a steady state reference signal level to said level detector coincident with said second predetermined value wherein the difference between the steady state reference signal level to said level detector established by said biasing means and the value of the output signal of said light detecting means at the commencement of an exposure interval corresponds to a first select change in the output signal of said light detecting means.

4. The camera of claim 3 wherein said means for effecting the displacement of said blade assembly into its said final closed arrangement includes a second level detector having means by which the output signal from said scene light detecting means may be applied thereto and an output signal derived therefrom wherein said output signal from said second level detector abruptly changes to initiate the displacement in response to the output signal of said scene light detecting means reaching said first predetermined value, and additionally including second biasing means for establishing a steady state reference signal level to said second level detector coincident with said first predetermined value wherein the difference between the steady state reference signal level to said second level detector established by said second biasing means and the value of the output signal of said light detecting means at the commencement of an exposure interval corresponds to a second select change in the output signal of said light detecting means greater than said first select change.

5. The camera of claim 4 wherein said means for changing the value of said output signal required to effect the displacement of said blade assembly includes means responsive to the abrupt change in the output signal of said first level detector for changing the reference signal level to said second level detector established by said second biasing means.

6. A photographic camera for use in ambient and artificial scene lighted conditions comprising:
   a housing;
   means within said housing for connecting to a source of electrical energy;
   means within said housing for receiving a source of artificial illumination;
   means within said housing for defining a film exposure plane;
   a blade assembly mounted and arranged within said housing for selective simultaneous displacement from an initial closed arrangement wherein said blade assembly precludes scene light from inpinging on said exposure plane to an open arrangement wherein said blade assembly permits scene light to impinge on said exposure plane and then to a final closed arrangement wherein said blade assembly again precludes scene light from impinging on said exposure plane, such a displacement of said blade assembly serving to define an exposure interval during which scene light impinges on said exposure plane through changing aperture sizes defined by said blade assembly;
   means for actuating said blade assembly to initiate displacement of said blade assembly from its said initial closed arrangement toward its said open arrangement thereby commencing said exposure interval;
   scene light detecting means responsive to scene light for providing an output signal in correspondence to detected scene light subsequent to the commencement of the exposure interval;
   means responsive to the commencement of said exposure interval for providing a first select output signal at a predetermined time interval subsequent to the commencement of the exposure interval;
   means for providing a second select output signal in response to the output signal of said scene light detecting means reaching a first predetermined value;
   means responsive to the first of said first and second select output signal conditions for initiating the energization of the source of artificial illumination;
   means for actuating said blade assembly to initiate the displacement of said blade assembly into its said final closed arrangement in response to the output signal of said scene light detecting means reaching a second predetermined value greater than said first predetermined value; and
   means responsive to the initiation of the energization of the source of artificial illumination by the second select output signal from said means for providing said second select output signal for altering the corresponding relationship between the detected scene light and second predetermined value from said detecting means thereby facilitating exposure operations where artificial illumination is utilized to fill in existing ambient scene light.

7. The camera of claim 6 including means responsive to said first select output signal when occurring before said second select output signal for disabling the effect of said means for altering the corresponding relationship between the detected scene light and said second predetermined value.

8. The camera of claim 6 wherein:
   said scene light detecting means include means for detecting and integrating scene light incident to the camera subsequent to the commencement of the exposure interval in order that the output signal from said scene light detecting means also correspond to integrated scene light; and
   the means for providing said second select output signal in response to the output signal of said scene light detecting means reaching said first predetermined value include a first signal level detector having means by which the output signal from said scene light detecting means may be applied thereto and an output signal derived therefrom wherein said output signal from said level detector abruptly changes to initiate said energization of the source of artificial illumination in response to the output signal of said scene light detecting means reaching said first predetermined value prior to said means for providing said first select output signal actually providing said first select output signal, and additionally including first biasing means for establishing a steady state reference signal level to said first level detector coincident with said first predetermined value wherein the difference between the steady state reference signal level to said level detector established by said biasing means and the output signal of said light detecting means at the commencement of said exposure cycle corresponds to a first select change in the output signal of said light detecting means.

9. The camera of claim 8 wherein said means for actuating said blade assembly to initiate the displacement of said blade assembly into its said final closed arrangement includes a second level detector having means by which the output signal from said scene light detecting means may be applied thereto and an output signal derived therefrom wherein said output signal from said second level detector abruptly changes to initiate the displacement of said blade assembly into its said final closed arrangement in response to the output signal of said scene light detecting means reaching said second predetermined value, and additionally including second biasing means for establishing a steady state reference signal level to said second level detector coincident with said first predetermined value wherein the difference between the steady state input signal level to said second level detector established by said second biasing means and the output signal of said detecting means at the commencement of said exposure cycle corresponds to a second select change in the output signal of said light detecting means greater than said first select change.

10. The camera of claim 9 wherein said means for altering the corresponding relationship between the detected scene light and second predetermined value includes means responsive to the abrupt change in the output signal of said first level detector for changing the reference signal level to said second level detector established by said second biasing means.

11. The camera of claim 10 wherein said means for providing said first select output signal at said predetermined time interval subsequent to the commencement of the exposure interval includes a counter responsive to the commencement of the exposure interval and having a plurality of binary circuits interconnected in serial relation for sequential actuation subsequent to the commencement of the exposure interval wherein a select binary circuit provides said first select output signal condition at said predetermined time interval subsequent to the commencement of the exposure interval.

12. The camera of claim 10 wherein said means for initiating the energization of the source of artificial illumination includes an OR gate having input terminals connected to receive said first and second select output signal conditions respectively.

13. The camera of claim 10 including means responsive to said first select output signal when occurring before said second select output signal for disabling the effect of said means for altering the corresponding relationship between the detected scene light and said second predetermined value.

14. A photographic camera for use in ambient and aritificial scene lighted conditions comprising:
   a housing;
   means within said housing for connecting to a source of electrical energy;
   means within said housing for electrically connecting to a source of artificial illumination;
   means within said housing for defining a film exposure plane;
   a blade assembly mounted and arranged within said housing for selective simultaneous displacement from an initial closed arrangement wherein said blade assembly precludes scene light from impinging on said exposure plane to an open arrangement wherein said blade assembly permits scene light to impinge on said exposure plane and then to a final closed arrangement wherein said blade assembly again precludes scene light from impinging on said exposure plane, such a displacement of said blade assembly serving to define an exposure interval during which scene light impinges on said exposure plane through changing aperture sizes defined by said blades;
   means for actuating said blade assembly to initiate displacement of said blade assembly from its said initial closed arrangement toward its said open arrangement thereby commencing said exposure interval;
   scene light detecting means responsive to scene light for providing an output signal in correspondence to detected scene light subsequent to the commencement of the exposure interval;
   means for initiating the energization of the source of artificial illumination in response to the output signal of said scene light detecting means reaching a first predetermined value thereby providing artificial illumination to fill in the ambient scene light;
   means for actuating said blade assembly to initiate the displacement of said blade assembly into its said final closed arrangement in response to the output signal of said scene light detecting means reaching a second predetermined value and additionally including means responsive to the electrical connection of the source of artificial illumination to said electrically connecting means for changing the corresponding relationship between said second predetermined value and detected scene light; and
   means responsive to the initiation of the energization of the source of artificial illumination in response to the output signal of said scene light detecting means reaching said first predetermined value for restoring the corresponding relationship between the detected scene light and second predetermined value as it exists when the source of artificial illumination is electrically disconnected from said electrical connecting means thereby facilitating exposure operations where artificial illumination is utilized to fill in existing ambient scene light.

15. The camera of claim 14 including means for otherwise actuating said means for initiating the energization of the source of artificial illumination if the output signal of said scene light detecting means fails to reach said first predetermined value prior to a select time delay.

16. The camera of claim 15 including means responsive to said means for otherwise actuating said means for initiating the energization of the source of artificial illumination prior to said scene light detecting means reaching said first predetermined value, for disabling the effect of said means for restoring the corresponding relationship between the detected scene light and second predetermined value regardless of said scene light detecting means thereafter reaching said first predetermined value.

17. The camera of claim 15 wherein:
   said scene light detecting means include means for detecting and integrating scene light incident to the camera subsequent to the commencement of the exposure interval in order that the output signal from said scene light detecting means also correspond to integrated scene light;
   the means for initiating the energization of the source of artificial illumination include a first signal level detector having means by which the output signal from said scene light detecting means may be applied thereto and an output signal derived therefrom wherein said output signal from said level detector abruptly changes to initiate said energization of the source of artificial illumination in response to the output signal of said scene light detecting means reaching said first predetermined value prior to said select time delay, and additionally including first biasing means for establishing a steady state reference signal level to said first level detector coincident with said first predetermined value wherein the difference between the steady state reference signal level to said level detector established by said biasing means and the output signal of said light detecting means at the commencement of an exposure interval corresponds to a first select change in the output signal of said light detecting means; and
   said means for actuating said blade assembly to initiate the displacement of said blade assembly into its said final closed arrangement includes a second level detector having means by which the output signal from said scene light detecting means may be applied thereto and an output signal derived therefrom wherein said output signal from said second level detector abruptly changes to initiate the displacement of said blade assembly into its said final closed arrangement in response to the output signal of said scene light detecting means reaching said second predetermined value, and additionally including second biasing means for establishing a steady state reference signal level to said second level detector coincident with said first predetermined value wherein the difference between the steady state reference signal level to said second level detector established by said second biasing means and the output signal of said biasing means at the commencement of an exposure interval corresponds to a second select change in the output signal of said light detecting means greater than said first select change.

18. The camera of claim 17 wherein said means for changing the corresponding relationship between said second predetermined value and the detected scene light in response to the electrical connection of the source of artificial illumination to said electrically connecting means includes means for changing the steady state reference signal level to said second level detector established by said second biasing means, and said means for restoring the corresponding relationship between the detected scene light and second predetermined value includes means responsive to the abrupt change in the output signal of said first level detector prior to said select time delay for restoring the steady state reference signal level to said second level detector as originally established by said biasing means.

19. The camera of claim 18 wherein:

said means for otherwise actuating said means for initiating the energization of the source of artificial illumination includes a counter responsive to the commencement of the exposure interval and having a plurality of binary circuits interconnected in serial relation for sequential actuation subsequent to the commencement of the exposure interval wherein a select binary circuit provides a select output signal at the expiration of said select time delay; and said means for initiating the energization of the source of artificial illumination includes an OR gate having input terminals connected respectively to receive said select output signal from said means for otherwise actuating said means for initiating the energization of the source of artificial illumination and the output signal from said first level detector.

20. The camera of claim 18 including means responsive to said means for otherwise actuating said means for initiating the energization of the source of artificial illumination prior to said scene light detecting means reaching said first predetermined value, for disabling the effect of said means for restoring the corresponding relationship between the detected scene light and second predetermined value regardless of said scene light detecting means thereafter reaching said first predetermined value.

* * * * *